US012621767B2

(12) United States Patent
Zhu

(10) Patent No.: US 12,621,767 B2
(45) Date of Patent: May 5, 2026

(54) COMMUNICATION METHOD AND APPARATUS, COMMUNICATION DEVICE, AND STORAGE MEDIUM

(71) Applicant: Beijing Xiaomi Mobile Software Co., Ltd., Beijing (CN)

(72) Inventor: Yajun Zhu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 392 days.

(21) Appl. No.: 18/259,418

(22) PCT Filed: Dec. 28, 2020

(86) PCT No.: PCT/CN2020/140290
§ 371 (c)(1),
(2) Date: Jun. 27, 2023

(87) PCT Pub. No.: WO2022/140951
PCT Pub. Date: Jul. 7, 2022

(65) Prior Publication Data
US 2024/0064635 A1      Feb. 22, 2024

(51) Int. Cl.
*H04W 52/02* (2009.01)
(52) U.S. Cl.
CPC ............................... *H04W 52/0225* (2013.01)
(58) Field of Classification Search
CPC ......... H04W 52/0225; H04W 52/0216; H04W 52/0235; H04W 52/028; H04W 76/28; H04W 52/0229; H04B 7/18519; G01S 5/0236; Y02D 30/70
See application file for complete search history.

(56) References Cited

U.S. PATENT DOCUMENTS

2019/0058522 A1      2/2019  Haley et al.
2023/0224094 A1*     7/2023  Hunukumbure ...... H04L 1/1816
                                                      370/328
2023/0239803 A1*     7/2023  Yin ..................... H04W 52/146
                                                      455/522

FOREIGN PATENT DOCUMENTS

CN      103701517 A      4/2014
CN      204374425 U      6/2015
CN      108700669 A      10/2018
CN      108988934 A      12/2018
CN      109640392 A      4/2019
CN      110474971 A      11/2019
CN      111182594 A      5/2020
CN      111866119 A      10/2020
(Continued)

OTHER PUBLICATIONS

Hu, Yu-xue, et al., "Design of Link Layer for LEO Satellite Communication System", Communications Technology, vol. 50, No. 10, Oct. 2017, doi:10.3969/j.issn.1002-0802.2017.10.025, 5 pages.

(Continued)

*Primary Examiner* — Walli Z Butt
(74) *Attorney, Agent, or Firm* — Finnegan, Henderson, Farabow, Garrett & Dunner, L.L.P.

(57)      ABSTRACT

A communication method is performed by a terminal, and includes: determining, according to configuration information, an entrance of the terminal into a power-saving state, wherein the configuration information is determined based on a coverage state of a service satellite of the terminal.

20 Claims, 5 Drawing Sheets

Terminal

Base station

S201. configuration information configured for determining an entrance of a terminal into a power-saving state is sent

(56) References Cited

FOREIGN PATENT DOCUMENTS

| CN | 111937450 A | 11/2020 |
| WO | WO 2012/079350 A1 | 6/2012 |

OTHER PUBLICATIONS

Wang Qian, "Brief Analysis of CMMB System Characteristics and Transmission and Reception Technologies", 1994-2024 China Academic Journal Electronic Publishing House, http://www.cnki.net, 2 pages.

Notification to Grant Patent Right for Invention, for Chinese Application No. 202080004222.4, issued Aug. 2, 2024, 11 pages.

International Search Report of International Application No. PCT/CN2020/140290, dated Sep. 6, 2021, 4 pages.

Office Action issued by the Intellectual Property India on Jul. 29, 2025, in corresponding Application No. IN 202327050517, 5 pages.

"Other aspects to support IoT in NTN", Huawei, HiSilicon, 3GPP TSG RAN WG1 #103-e, R1-2008320, E-meeting, Oct. 26-Nov. 13, 2020, 2 pages.

* cited by examiner

S101

An entrance of a terminal into a power-saving state is determined according to configuration information Communication apparatus 500

First determination module 501

FIG. 5

Communication apparatus 600

Sending module 601

FIG. 6

COMMUNICATION METHOD AND APPARATUS, COMMUNICATION DEVICE, AND STORAGE MEDIUM

CROSS REFERENCE TO RELATED APPLICATION

The present disclosure is the U.S. national phase application of International Application No. PCT/CN2020/140290 tiled on Dec. 28, 2020, the content of which is incorporated herein by reference in its entirety.

TECHNICAL FIELD

The present disclosure relates, but is not limited, to the field of wireless communication, in particular to a communication method, a communication apparatus, a communication device and a storage medium.

BACKGROUND

Satellite communication is increasingly being utilized in the field of wireless communication. The satellite communication refers to the communication carried out by radio communication equipment on the ground by using a satellite as a relay. A satellite communication system consists of a satellite part and a ground part. The satellite communication has advantages of a large communication range and less susceptibility to terrestrial disasters.

SUMMARY

The present disclosure provides a communication method, an apparatus, a communication device, and a storage medium.

According to a first aspect of embodiments of the present disclosure, a communication method is provided, which is applied to a terminal, and includes: determining, according to configuration information, an entrance of the terminal into a power-saving state, wherein the configuration information is determined based on a coverage state of a service satellite of the terminal.

According to a second aspect of embodiments of the present disclosure, a communication method is provided, which is applied to a base station, and includes: sending configuration information configured for determining an entrance of a terminal into a power-saving state, wherein the configuration information is determined based on a coverage state of a service satellite of the terminal.

According to a third aspect of embodiments of the present disclosure, a communication apparatus is provided, which is applied to a terminal, and includes: a first determination module configured to determine, according to configuration information, an entrance of the terminal into a power-saving state, wherein the configuration information is determined based on a coverage state of a service satellite of the terminal.

According to a fourth aspect of embodiments of the present disclosure, a communication apparatus is provided, which is applied to a base station, and includes: a sending module configured to send configuration information configured for determining an entrance of a terminal into a power-saving state, wherein the configuration information is determined based on a coverage state of a service satellite of the terminal.

According to a fifth aspect of embodiments of the present disclosure, a communication device is provided, which at least includes a processor and a memory for storing executable instructions capable of running on the processor; wherein when the executable instructions run on the processor, steps of any of communication methods mentioned above are caused to be executed.

According to a sixth aspect of embodiments of the present disclosure, a non-transitory computer-readable storage medium is provided, which has computer executable instructions stored thereon, when the computer executable instruction are executed by a processor, steps of any of communication methods mentioned above are caused to be executed.

BRIEF DESCRIPTION OF THE DRAWINGS

The drawings herein, which are incorporated in and constitute a part of this specification, illustrate embodiments consistent with the present disclosure and serve together with the specification to explain principles of the present disclosure.

FIG. 5 is a block diagram of a communication apparatus according to exemplary embodiments;

FIG. 6 is a block diagram of a communication apparatus according to exemplary embodiments;

DETAILED DESCRIPTION

Figures 1, 2:
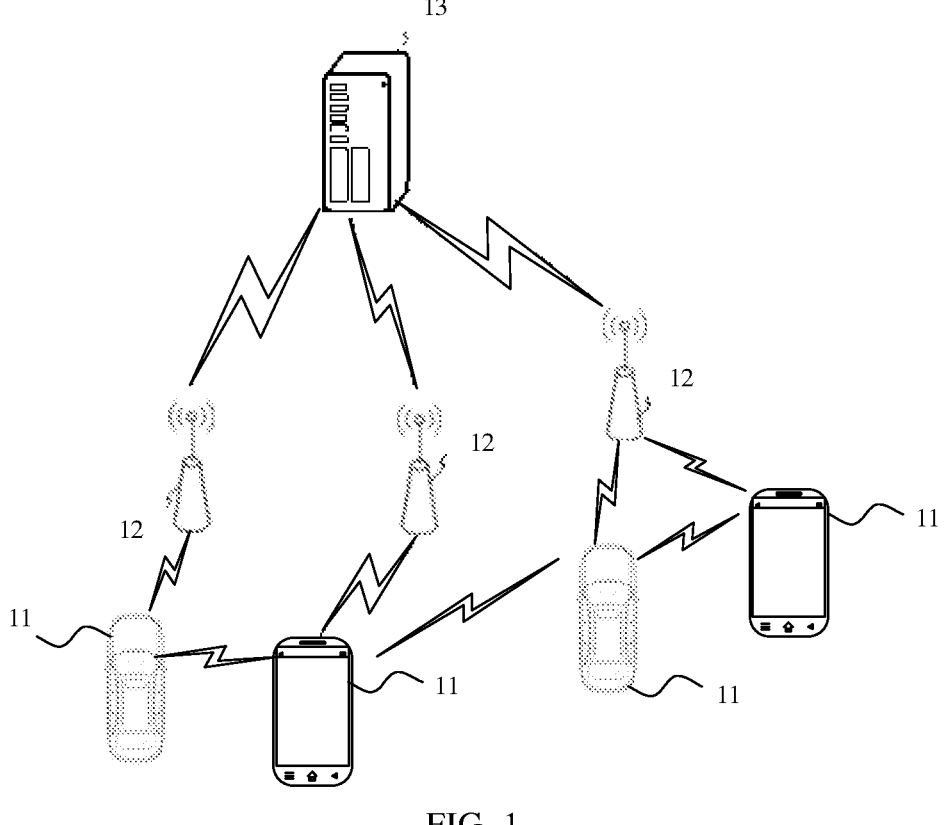
FIG. 1 is a schematic diagram of a wireless communication system according to exemplary embodiments.
FIG. 2 is a flowchart of a communication method according to exemplary embodiments.

Some embodiments will be explained herein in detail, and examples are illustrated in the drawings. When referring to the drawings, unless otherwise indicated in the following descriptions, the same numerals in different drawings represent the same or similar elements. Implementations described in following embodiments do not represent all implementations consistent with the present disclosure. Instead, they are only examples of devices and methods consistent with some aspects of embodiments of the present disclosure as detailed in the attached claims.

Terms used in embodiments disclosed in the present disclosure are for the purpose of description of specific embodiments only, and are not intended to limit the embodiments of the present disclosure. Singular forms such as "a" and "the" used in embodiments of the present disclosure and the attached claims are also intended to include plural forms, unless other meanings are clearly indicated in the context. It should also be understood that the term "and/or" used herein refers to and includes any or all possible combinations of one or more related items listed, It should be understood that although terms such as first, second, and third may be used to describe various information in embodiments of the present disclosure, these information should not be limited to these terms, which are only used to distinguish information of the same type from each other. For example, without departing from the scope of the present disclosure, the first information can also be referred to as the second information, and similarly, the second information can also be referred to as the first information. The word "if" and "in case" used herein can be interpreted as "when" or "while" or "in response to determination that", depending on the context.

In order to better describe embodiments of the present disclosure, an application scenario of access control is taken as an example for illustrative explanation in one embodiment of the present disclosure.

Reference is made to FIG. 1, which illustrates a schematic diagram of a wireless communication system provided by embodiments of the present disclosure. As shown in FIG. 1, the wireless communication system is a communication system based on cellular mobile communication technology, Which may include several terminals 11 and several base stations The terminal 11 can be equipment that provides voice and/or data connectivity to a user. The terminal 11 can communicate with one or more core networks via a Radio Access Network (RAN). The terminal 11 can be an IoT (Internet of Things) terminal, fir example, a sensor device, a mobile phone (or a "cellular" phone), and a computer with IoT terminals, such as fixed, portable, pocket, handheld, computer built-in, or vehicle mounted devices. For example, stations (STA), subscriber units, subscriber stations, mobile stations, mobiles, remote stations, access points, remote terminals, access terminals, user terminals, user agents, user devices or terminals. Alternatively, the terminal 11 can also be a device for unmanned aerial vehicles. Alternatively, the terminal 11 can also be an onboard device, such as a trip computer with wireless communication ability or wireless terminals connected to an external trip computer. Alternatively, the terminal 11 can also be a roadside device, such as a street light, a signal light, or other roadside devices with wireless communication ability.

Base station 12 can be a network side device in the wireless communication system. The wireless communication system can be the 4th generation (4G) mobile communication system, also known as Long Term Evolution (LTE) system. Alternatively, the wireless communication system can also be the 5th generation (5G) system, also known as New Radio system or 5G NR system. Alternatively, the wireless communication system can also be the next generation system following 5G system. The access network in 5G system can be referred to as the New Generation-Radio Access Network (NG-RAN).

Base station 12 can be the Evolved Node B (eNB) employed in 4G system. Alternatively, base station 12 can also be the next Generation Node B (gNB) constructed in a centralized and distributed architecture in 5G system. When constructed in the centralized and distributed architecture, base station 12 usually includes a central unit (CU) and at least two distributed units (DUs). The central unit is provided with a protocol stack consisting of the Packet Data Convergence Protocol (PDCP) layer, the Radio Link Control (RLC) layer, and the Medium Access Control (MAC) layer. The distributed unit is provided with a protocol stack of the physical (PHY) layer. Specific implementations of base station 12 are not limited in embodiments of the present disclosure.

A wireless connection can be established between the base station 12 and the terminal 11 via a wireless air interface. In different implementations, the wireless air interface is based on the 4th generation (4G) mobile communication network technology standard. Alternatively, the wireless air interface is based on the 5th generation (5G) mobile communication network technology standard, for example, the wireless air interface is the New Radio. Alternatively, the wireless air interface can also be a wireless air interface based on the next generation mobile communication network technology standard following 5G.

In some embodiments, an E2E (End to End) connection can also be established between the terminal 11, For example, in vehicle to everything (V2X) communication, there are scenarios where vehicle to vehicle (V2V) communication, vehicle to infrastructure (V2I) communication, and vehicle to pedestrian (V2P) communication are established.

In some embodiments, the wireless communication system described above can also include a network management device 13.

Some of base stations 12 are respectively connected to the network management device 13. The network management device 13 can be a core network device in the wireless communication system, for example, the network management device 13 can be the Mobility Management Entity (MME) in the Evolved Packet Core (EPC). Alternatively, the network management device can also be other core network devices, such as the Service GateWay (SGW), the Public Data Network GateWay (PGW), the Policy and Charging Rules Function (PCRF), or the Home Subscriber Server (HSS). Implementations of the network management device 13 are not limited in embodiments of the present disclosure.

The constantly emergence of new Internet applications such as new generation of augmented reality (AR), virtual reality (VR), and vehicle to vehicle communication has placed higher requirements on wireless communication technology, driving the continuous evolution of the wireless communication technology to meet needs of the applications. The cellular mobile communication technology is currently in an evolution stage of a new generation technology. An important feature of the new generation technology is to support the flexible configuration of multiple business types. A new generation of wireless communication system requires flexible and configurable designs to support the transmission of multiple business types, due to different requirements on wireless communication technology from different business types. For example, a main requirement of eMBB (Enhanced Mobile Broadband) is focused on large bandwidth, high speed, etc; a main requirement of URLLC (Ultra Reliable Low Latency Communication) is focused on high reliability and low latency; and a main requirement of mMTC (Massive Machine Type Communication) is focused on a large number of connections.

In wireless communication technology, the satellite communication is an important development aspect of future wireless communication technology. The satellite communication refers to the communication carried out by radio communication equipment on the ground by using a satellite as a relay. A satellite communication system consists of a satellite part and a ground part. The satellite communication is characterized in large communication range. As long as it is within the range covered by the radio waves emitted by the satellite, communication can be carried out between any two locations. The satellite communication is also not easily affected by terrestrial disasters (high reliability). The satellite communication, as a supplement to current ground cellular communication system, can provide benefits including:

first, extended coverage; for areas, such as oceans, deserts, remote mountainous areas, etc., where current cellular communication system cannot cover or brings high coverage costs, the satellite communication can be used to solve communication problems;

second, emergency communication; in extreme situations such as disasters (such as earthquakes), which would result in unavailability of the cellular communication infrastructure, the communication connection can be quickly established by using the satellite communication;

third, provision of industry applications; for the delay sensitive business transmitted over long distances, for example, the satellite communication can be used to reduce the delay of the business transmission.

As can be conceived, in future wireless communication system, the satellite communication system and the ground cellular communication system will gradually come into deep integration, truly achieving the intelligent internet of all things, Based on the integration of the satellite communication system and ground communication system mentioned above, embodiments of the present disclosure provide a communication method, as shown in FIG. 2. The method is applied to a terminal, and includes the following step.

In step S101, an entrance of a terminal into a power-saving state is determined according to configuration information. In some embodiments, the configuration information is determined based on a coverage state of a service satellite of the terminal.

In embodiments of the present disclosure, the terminal can switch between different states according to the configuration information determined based on the coverage state of the service satellite. The power-saving state of the terminal is a state to determine a switching approach between an active state and a sleep state based on the coverage state of the service satellite. Compared to a periodic activation approach not taking the coverage of the satellite into account, the power-saving state can be non-periodic activation. In some embodiments, in the case of the coverage of the service satellite, the terminal enters the active state, while in a range not covered by the service satellite, a communication behavior such as PDCCH listening is not carried out. That is, the terminal remains in the sleep state. The sleep state includes an idle state and an inactive state. In some embodiments, within the coverage range of the service satellite, the terminal enters a periodic listening state, while within a coverage range not covered by the service satellite, the terminal remains in the sleep state and does not perform periodic state switching.

In some embodiments, the terminal adopts a periodic mode of DRX configuration, and achieves the goal of saving power consumption by periodically entering the active state to listen to the PDCCH However, such periodic mode does not take into account the characteristics of the coverage of the satellite. When the terminal is outside the coverage range of the service satellite, the terminal is still periodically activated and listens to the PDCCH, but in fact, the terminal cannot receive downlink information, resulting in waste of power consumption.

In embodiments of the present disclosure, the terminal performs state switching based on the characteristics of the coverage of the service satellite. That is, the terminal enters the power-saving state according to the configuration information determined based on the coverage state of the service satellite. As a result, the normal communication of the terminal within the coverage range of the service satellite would not be affected, the waste of power consumption outside the coverage range of the service satellite can be reduced, and the goal of power-saving is achieved.

In some embodiments, the configuration information is specified by a protocol or sent by a base station.

In embodiments of the present disclosure, the terminal can determine above configuration information through the specification of the protocol, and can also obtain the above configuration information from the base station. For example, the base station obtains information related to the coverage state of the service satellite, and the terminal can receive the configuration information determined by the base station based on the state of the service satellite.

In some embodiments, the terminal can also obtain the above configuration information through a predetermined approach specified in the protocol. For example, according to the specification of the protocol, the above configuration information is received, and the terminal determines its own listening state based on the configuration information specified in the protocol, and so on. In some other embodiments, according to the protocol, the terminal itself can determine the above configuration information based on ephemeris information when obtaining the ephemeris information and other information of the service satellite. For example, the time when the terminal enters the power-saving state is determined based on the ephemeris information.

In some embodiments, the configuration information is sent by the base station, and the method includes:

a signalling carrying the configuration information sent by the base station is received, and the signalling includes at least one of:

radio resource control (RRC) signalling, MAC signalling, and physical layer signalling.

The terminal can receive the above configuration information through different signallings on respective layers during random access to the base station. For example, a field or a character bit corresponding to the above configuration information is added to the above signalling. The signalling can also be implicit, for example, the above configuration information is identified through encoding and decoding, through a verification method, etc.

According to embodiments of the present disclosure, the configuration information sent by the base station can be obtained during random access to the base station by the terminal, and specific information for the entrance of the terminal itself into the above power-saving state can be further determined.

In some embodiments, the terminal can also obtain the above configuration information through a dedicated signalling or through a broadcast from the base station.

In some embodiments, the configuration information includes at least one of:

time information configured fix determining the entrance of the terminal into the power-saving state; and indication information configured for indicating the entrance of the terminal into the power-saving state.

In embodiments of the present disclosure, the terminal can determine based on the above configuration information the time information for the entrance of the terminal into the power-saving state, such as a starting time, an ending time, or a duration, etc. for the entrance into the power-saving state. The terminal can determine when to enter the power-saving state and when to end the power-saving state based on the above time information.

In some embodiments, the above configuration information can also be indication information for indicating the entrance of the terminal into the power-saving state. That is, the terminal can enter the power-saving state according to the indication information after receiving the configuration information, and determine based on the configuration information a switching approach for activation or sleep and a switching cycle in the power-saving state.

It should be noted that entrance of the terminal into the power-saving state does not mean that the terminal has entered the sleep state, but rather a more power-saving approach is employed compared to the conventional periodic activation approach.

In some embodiments, in the power-saying state, within the coverage range of the service satellite, the terminal can switch between the active state and the sleep state according to a predetermined first cycle, while outside the coverage range of the service satellite, the terminal can switch between the active state and the sleep state according to a predetermined second cycle. In some embodiments, in the case of being outside the coverage range of the service satellite, a duration of the active state within each cycle is shorter than a duration of the active state within each cycle within the coverage range. In a non-power-saving state, the terminal can switch between the active state and the sleep state according to a cycle, a duration, etc. in the DRX configuration.

In sonic embodiments, in the power-saving state, if the terminal is outside the coverage range of the service satellite, it enters the sleep state. If the terminal is within the coverage range of the service satellite, it switches between states according to the cycle, the duration, etc. in the DRX configuration.

In some embodiments, the time information includes:

the time information for the entrance of the terminal into the power-saving state determined based on the ephemeris information of the service satellite.

The above time information can be the time information configured for determining the entrance of the terminal into the power-saving state. In some embodiments, information can be determined based on the ephemeris information of the service satellite: the entrance of the terminal into the power-saving state after a specified duration, a duration during which the terminal maintains in the power-saving state after entering the power-saving state, or time, a cycle, etc. for performing switching between the active state and the sleep state after entering the power-saving state.

The above time information can be absolute time, for example, the terminal is in the power-saving state for 1 hour, enters the power-saving state after 20 minutes, etc. The above time information can also be logical time, for example, the terminal is in the power-saving state for 1000 subframes, etc. In some embodiments, the time information can also include reference duration information of the logical time mentioned above, for example, the logical time is 10 time slots. An absolute duration corresponding to each time slot can be determined based on numerology information corresponding to the time slot. For example, if a parameter frequency is 15 kHz, then the duration of each time slot is 1 ms (millisecond).

In some embodiments, the power-saving state includes an active state and a sleep state of a DRX configuration. The indication information includes at least one of:

a starting time and a duration indicating an entrance of the terminal into the active state or the sleep state;

the starting time and an ending time indicating the entrance of the terminal into the active state or the sleep state;

detection information indicating that the terminal performs downlink information detection after entering the active state or the sleep state; and satellite information indicating the service satellite of the terminal within at least one service period.

In embodiments of the present disclosure, the power-saving state includes at least the active state and the sleep state of the DRY configuration. In some embodiments, the above indication information can include time information related to switching between the active state and the sleep state by the terminal.

In embodiments of the present disclosure, after receiving the above indication information, the terminal can enter the power-saving state and switch between the active state and the sleep state based on the starting time and the duration or the ending time for the entrance into the active state or the sleep state contained in the indication information.

In embodiments of the present disclosure, the above indication information may also include behaviors of the terminal after it enters the active state or the sleep state. For example, after entering the sleep state, the terminal would still perform some detection on downlink information, such as physical layer downlink signals or downlink signallings. In some embodiments, the above indication information can also be configured for indicating the time, a cycle, a number of detections, and a detection approach, on the basis of which the terminal performs the detection on downlink signals or downlink signallings, In some embodiments, the above indication information can also include relevant information indicating the service satellite of the terminal in the subsequent period, such as satellite information of a next service satellite. As a result, it is convenient for the terminal to determine based on the indication information, subsequent entrances into the power-saving state.

In some embodiments, the detection information includes at least one of:

a detection approach;

a number of detections; and identification information.

In some embodiments, after entering the active state or the sleep state, the terminal can determine based on the above detection information a detection behavior of itself. If the above detection approach is included, for example, based on the indication information, the terminal needs to perform the detection on PDCCH in the power-saving state, the detection approach includes an aggregation level of downlink control information carried on PDCCH, the number of detections and the type of the downlink control information.

In some embodiments, the method further includes:

in response to the entrance of the terminal into the sleep state based on the indication information, detection is performed according to the detection information.

In embodiments of the present disclosure, after the terminal enters the sleep state based on the indication information, the behavior of the terminal after entering the sleep state call be determined by detecting the information.

In some embodiments, after entering the sleep state, the terminal does not perform any uplink data transmission, and can perform periodic detection on GNSS (Global Navigation Satellite System) information, positioning information, or other information that needs to be detected, based on the detection approach, the number of detections, and the identification information determined through the above detection information.

Figure 3:
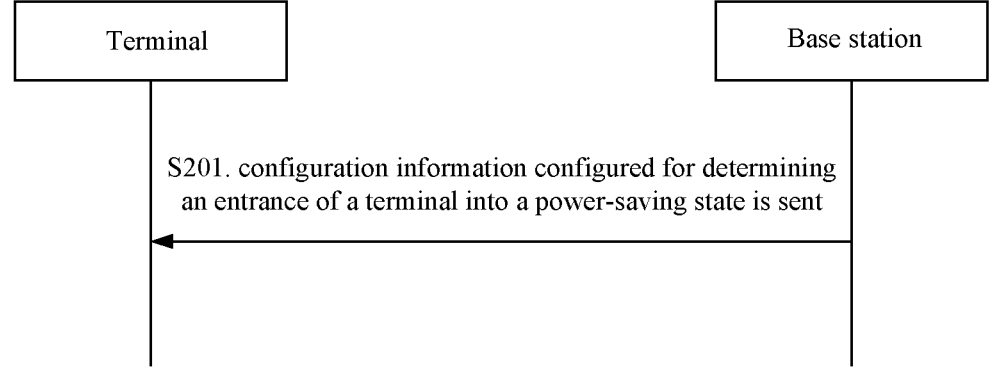
FIG. 3 is a flowchart of a communication method according to exemplary embodiments.

In some embodiments, the terminal can also determine based on the configuration information when to switch to the active state, as well as enable a quick systematic access for relevant information when switching to the active state, such as the quick access for required random access preamble (preamble sequence), time-frequency resources, and other information As shown in FIG. 3, embodiments of the present disclosure provide a communication method. The method is applied to a base station, and includes the following step.

In step S201, configuration information configured for determining an entrance of a terminal into a power-saving state is sent. In some embodiments, the configuration information is determined based on a coverage state of a service satellite of a terminal.

In embodiments of the present disclosure, the power-saving state of the terminal is a mode of switching between states of the terminal based on the coverage state of the service satellite. Compared to a periodic activation approach not taking the coverage of the satellite into account, the power-saving state can be non-periodic activation. In some embodiments, in the case of the coverage of the service satellite, the terminal enters the active state, while in a range not covered by the service satellite, a communication behavior such as PDCCH listening is not carried out. That is, the terminal remains in the sleep state. In some embodiments, within the coverage range of the service satellite, the terminal enters a periodic listening state, while within a coverage range not covered by the service satellite, the terminal remains in the sleep state and does not perform periodic state switching.

In some embodiments, the base station can send the above configuration information to the terminal based on the specification of the protocol. For example, when the terminal is in the connected state, the base station sends the above configuration information to the terminal. When the terminal is in the idle state or the inactive state, the base station sends the above configuration information through broadcasting.

In embodiments of the present disclosure, the base station determines the above configuration information based on the coverage state of the service satellite of the terminal, which is convenient for the terminal to perform state switching based on the characteristics of the coverage of the service satellite. That is, the terminal enters the power-saving state according to the configuration information determined based on the coverage state of the service satellite. As a result, the normal communication of the terminal within the coverage range of the service satellite would not be affected, the waste of power consumption outside the coverage range of the service satellite can be reduced, and the goal of power-saving is achieved, In some embodiments, that configuration information configured for determining an entrance of a terminal into a power-saving state is sent includes:

a signalling carrying the configuration information is sent, and the signalling includes at least one of:

RRC signalling. MAC signalling, and physical layer signalling.

The base station can carry the above configuration information through different signallings on respective layers during a random access process of the terminal. For example, a field or a character bit corresponding to the above configuration information is added to the above signalling. The signalling can also be implicit, for example, the above configuration information is identified through encoding and decoding, through a verification method, etc.

According to embodiments of the present disclosure, during a process such as the random access of the terminal, the base station can send the configuration information determined based on the coverage of the service satellite to the terminal, so that it is easy for the terminal to determine the entrance into the power-saving state.

In some embodiments, the base station can also send the above configuration information through a dedicated signalling.

In some embodiments, the configuration information includes at least one of:

time information configured for determining the entrance of the terminal into the power-saving state; and indication information configured for indicating the entrance of the terminal into the power-saving state.

In embodiments of the present disclosure, the above configuration information can be used by the terminal to determine the time information for the entrance into the power-saving state, such as a starting time, an ending time, or a duration, etc. for the entrance into the power-saving state. The terminal can determine how to proceed based on the above time information.

In some embodiments, the above configuration information can also be indication information for indicating the entrance of the terminal into the power-saving state. That is, the terminal can enter the power-saving state after receiving the configuration information, and determine based on the configuration information a switching approach for activation or sleep and a switching cycle in the power-saving state.

It should be noted that entrance of the terminal into the power-saving state does not mean that the terminal has entered the sleep state, but rather a more power-saving approach is employed compared to the conventional periodic activation approach.

In some embodiments, in the power-saving state, within the coverage range of the service satellite, the terminal can switch between the active state and the sleep state according to a predetermined first cycle, while outside the coverage range of the service satellite, the terminal can switch between the active state and the sleep state according to a predetermined second cycle. In some embodiments, in the case of being outside the coverage range of the service satellite, a duration of the active state within each cycle is shorter than a duration of the active state within each cycle within the coverage range. In a non-power-saving state, the terminal can switch between the active state and the sleep state according to a cycle, a duration, etc. in the DRX configuration.

In some embodiments, in the power-saving state, if the terminal is outside the coverage range of the service satellite, it enters the sleep state. If the terminal is within the coverage range of the service satellite, it switches between states according to the cycle, the duration, etc. in the DRX configuration.

In some embodiments, the time information includes:

the time information for the entrance of the terminal into the power-saving state determined based on the ephemeris information of the service satellite.

The above time information can be the time information configured for determining the entrance of the terminal into the power-saving state. In some embodiments, information can be determined based on the ephemeris information of the service satellite: the entrance of the terminal into the power-saving state after a specified duration, a duration during which the terminal maintains in the power-saving state after entering the power-saving state, or time, a cycle, etc. for performing switching between the active state and the sleep state after entering the power-saving state.

The above time information can be absolute time, for example, the terminal is in the power-saving state for 1 hour, enters the power-saving state after 20 minutes, etc. The above time information can also be logical time, for example, the terminal is in the power-saving state for 1000 subframes, etc. In some embodiments, the time information can also include reference duration information of the logical time mentioned above, for example, the logical time is 10 time slots. An absolute duration corresponding to each time slot can be determined based on numerology information corresponding to the time slot. For example, if a parameter frequency is 15 kHz, then the duration of each time slot is 1 ms.

In some embodiments, the power-saving state includes an active state and a sleep state of a DRX configuration. The indication information includes at least one of:

a starting time and a duration indicating an entrance of the terminal into the active state or the sleep state;

the starting time and an ending time indicating the entrance of the terminal into the active state or the sleep state;

detection information indicating that the terminal performs downlink information detection after entering the active state or the sleep state; and satellite information indicating the service satellite of the terminal within at least one service period.

In embodiments of the present disclosure, the power-saving state includes at least the active state and the sleep state of the DRX configuration. In some embodiments, the above indication information can include time information related to switching between the active state and the sleep state by the terminal.

In embodiments of the present disclosure, after the base station sends the above indication information to the terminal, the terminal can enter the power-saving state and switch between the active state and the sleep state based on the starting time and the duration or the ending time for the entrance into the active state or the sleep state contained in the indication information.

In embodiments of the present disclosure, the above indication information may also include behaviors of the terminal after it enters the active state or the sleep state. For example, after entering the sleep state, the terminal performs some detection on downlink information, such as physical layer downlink signals or downlink signallings. In some embodiments, the above indication information can also be configured for indicating the time, a cycle, a number of detections, and a detection approach, on the basis of which the terminal performs the detection on downlink signals or downlink signallings.

In some embodiments, the detection information includes at least one of a detection approach;

a number of detections; and identification information.

In some embodiments, after entering the active state or the sleep state, the terminal can determine based on the above detection information a detection behavior of itself. If based on the indication information, the terminal needs to perform the detection on PDCCH in the power-saving state, the detection approach includes an aggregation level of downlink control information carried on PDCCH, the number of detections and the type of the downlink control information.

Embodiments of the present disclosure also provide the following example.

Figure 4:
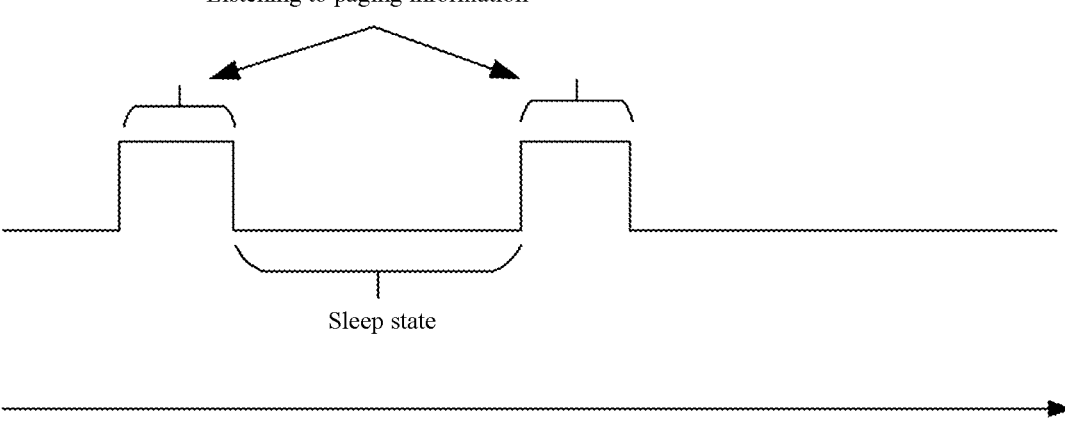
FIG. 4 is a schematic diagram of a terminal listening to paging information according to exemplary embodiments.

In some embodiments, when the terminal is in the sleep state, it needs to periodically listen to the PDCCH based on the configuration of the base station, to determine whether it needs to enter the active state. In order to listen to the PDCCH, the terminal needs to continuously listen for a period of time, which would cause the terminal to consume a certain amount of energy, as shown in FIG. 4.

For satellite communication, in an early stage of a low earth orbit satellite deployment, it is not possible to achieve an all-weather coverage due to the limited number of satellites. In this case, the terminal may only be able to carry out data interaction when there is satellite coverage. During other time, it is not necessary for the terminal to receive downlink signals or signallings, as well as send uplink signals or signallings. Therefore, the above periodic listening of PDCCH, i.e. the periodic mode of DRX configuration, would result in more power consumption waste.

In embodiments of the present disclosure, a method is provided for terminal power saving that can be applied to a satellite communication system, thereby reducing ineffective operations of the terminal in the absence of coverage provided by service satellites, saving power consumption of the terminal and achieving the goal of power saving.

In embodiments of the present disclosure, the terminal determines based on the presence of the service satellite the entrance into the sleep state.

In approach 1: based on ephemeris information.

The terminal determines based on the ephemeris information the time information for the entrance into the sleep state. The time information can be absolute time, such as 1 hour. The time information can also be logical time, such as 1000 subframes. When the time information is the logical time, reference duration information of the logical time is also required. For example, when the time information is 10 time slots, numerology information corresponding to the time slot is also required. For example, when a frequency indicated by the numerology is 15 KHz, the duration of a time slot is 1 millisecond.

The terminal can obtain the information through a pre-defined method or by obtaining the configuration information sent by the base station to the terminal through the satellite. The configuration information is notified to the terminal through high-level signalling such as RRC signalling, MAC signalling, or physical layer signalling.

In approach 2: based on the indication information that triggers the terminal to enter the power-saving state, that is, based on a trigger signalling.

In some embodiments, the terminal enters the sleep state or the active state based on a triggering instruction sent by the base station. The triggering instruction can be a high-layer signalling or the physical layer signalling. The following information can be included in the signalling:

the starting time, the duration, or the ending time indicating a needed entrance of the terminal into the sleep state or the active state;

detection information indicating the detection behavior of the terminal after the entrance into the active state or the sleep state; and relevant information indicating the service satellite of the terminal for providing service within next service time.

The signallings used for indicating the entrance into the sleep state or the active state can be the same signalling or different signallings. The terminal can determine based on a pre-defined method or configuration information received from base station the way in which the triggering signalling is received, including the time information, the detection approach such as the aggregation level, the number of detections, RNTI (Radio Network Temporary Identity), etc.

After entering the sleep state, the terminal determines based on the pre-defined method or the way notified by the triggering signalling its behavior after the entrance into the sleep state.

In some embodiments, the terminal does not perform any uplink data transmission after entering the sleep state. While based on the configuration information, the terminal needs to perform periodic detection on GNSS information or other information that needs to be detected. In addition, the terminal can also determine based on the configuration information a quick access to the system the terminal needs to perform when switching to the active state. The relevant configuration information for the quick access to the system is, for example, random access preambles and time-frequency resources.

Figures 5, 6:
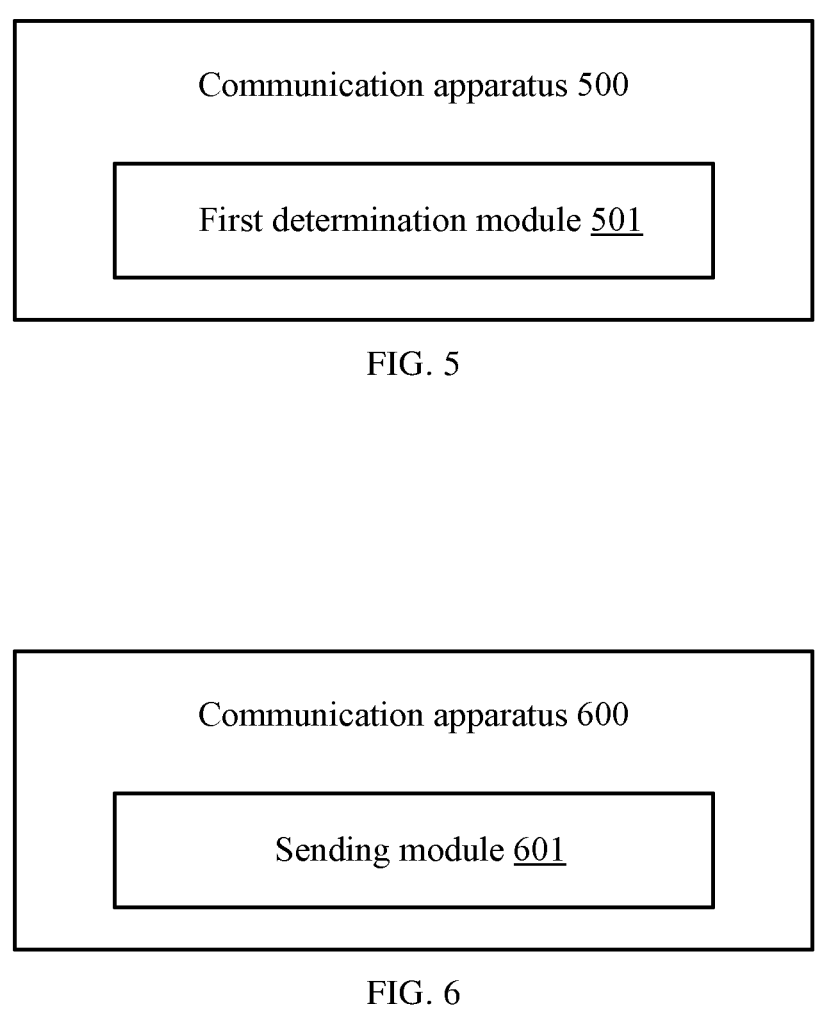

As shown in FIG. 5, embodiments of the present disclosure also provide a communication apparatus 500. The apparatus is applied to a terminal, and includes a first determination module 501.

The first determination module 501 is configured to determine, according to configuration information, an entrance of the terminal into a power-saving state, wherein the configuration information is determined based on a coverage state of a service satellite of the terminal.

In some embodiments, the configuration information is specified by a protocol or sent by a base station.

In some embodiments, the apparatus further includes a first receiving module.

The first receiving module is configured to receive a signalling carrying the configuration information sent by the base station, wherein the signalling comprises at least one of:

RRC signalling, MAC signalling, and physical layer signalling.

In some embodiments, the configuration information includes at least one of:

time information configured for determining the entrance of the terminal into the power-saving state; and indication information configured for indicating the entrance of the terminal into the power-saving state.

In some embodiments, the time information includes:

the time information for the entrance of the terminal into the power-saving state determined according to ephemeris information of the service satellite.

In some embodiments, the power-saving state includes an active state and a sleep state of DRX configuration. The indication information includes at least one of:

a starting time and a duration indicating an entrance of the terminal into the active state or the steep state;

the starting time and an ending time indicating the entrance of the terminal into the active state or the sleep state;

detection information indicating that the terminal performs downlink information detection after entering the active state or the sleep state; and satellite information indicating the service satellite of the terminal within at least one service period.

In some embodiments, the detection information includes at least one of:

a detection approach;

a number of detections; and identification information.

In some embodiments, the apparatus further includes a detection module.

The detection module is configured to perform, in response to the entrance of the terminal into the sleep state based on the indication information, detection according to the detection information.

As shown in FIG. 6, embodiments of the present disclosure also provide a communication apparatus 600. The apparatus is applied to a base station, and includes a sending module 601.

The sending module 601 is configured to configuration information configured for determining an entrance of a terminal into a power-saving state, wherein the configuration information is determined based on a coverage state of a service satellite of the terminal.

In some embodiments, the sending module includes a sending sub module.

The sending sub module is configured to send a signalling carrying the configuration information, wherein the signalling comprises at least one of:

RRC signalling MAC signalling, and physical layer signalling.

In some embodiments, the configuration information includes at least one of:

time information configured for determining the entrance of the terminal into the power-saving state; and indication information configured for indicating the entrance of the terminal into the power-saving state.

In some embodiments, the time information includes:

the time information for the entrance of the terminal into the power-saving state determined according to ephemeris information of the service satellite.

In some embodiments, the power-saving state includes an active state and a sleep state of DRX configuration. The indication information includes at least one of:

a starting time and a duration indicating an entrance of the terminal into the active state or the sleep state;

the starting time and an ending time indicating the entrance of the terminal into the active state or the sleep state;

detection information indicating that the terminal performs downlink information detection after entering the active state or the sleep state; and satellite information indicating the service satellite of the terminal within at least one service period.

In some embodiments, the detection information includes at least one of a detection approach;

a number of detections; and identification information.

Specific ways in which each module of the apparatus in above embodiments performs operations have been explained in detail in related method embodiments, and will not be repeated herein.

Figure 7:
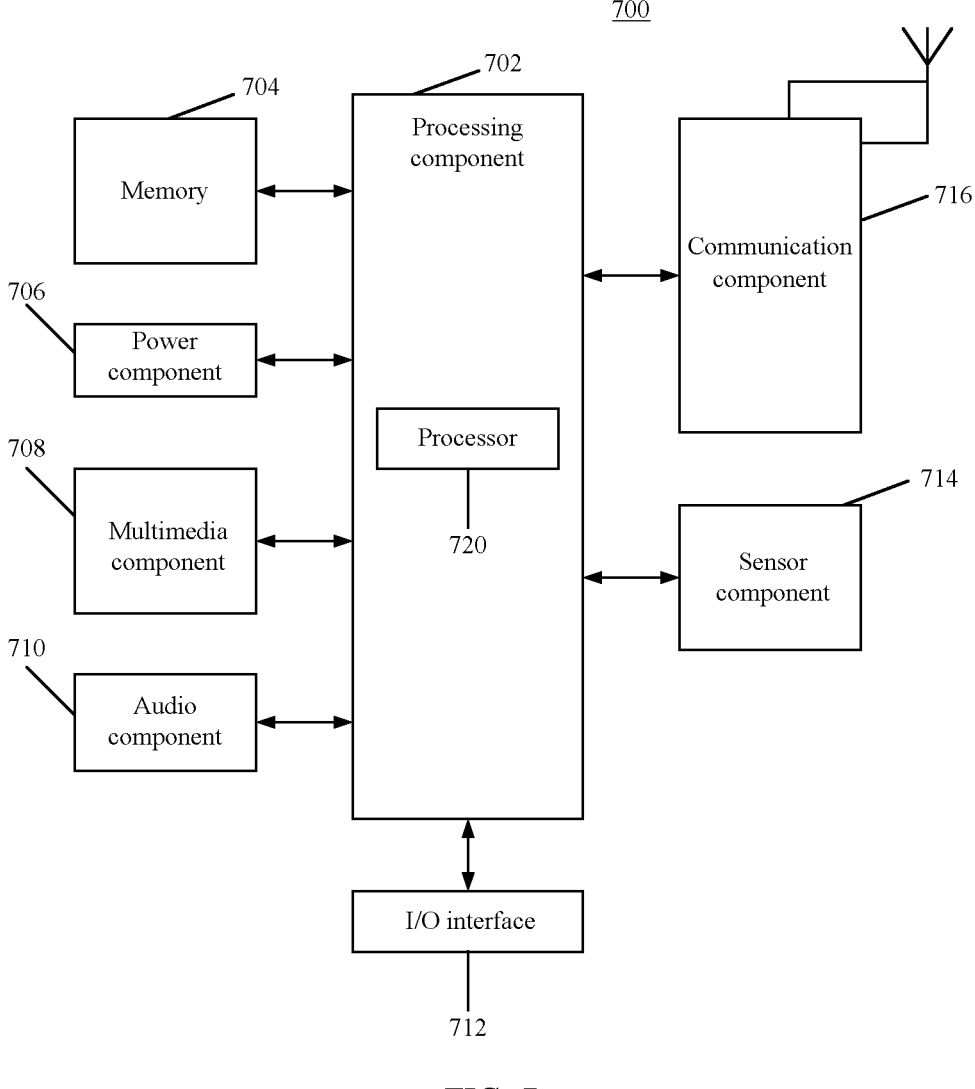
FIG. 7 is a schematic diagram of a communication device according to exemplary embodiments.

FIG. 7 is a schematic diagram of a communication device provided in embodiments of the present disclosure. The communication device can be a terminal. For example, communication device 700 can be a mobile phone, a computer, a digital broadcasting user device, a messaging device, a game console, a tablet device, a medical device, a fitness device, a personal digital assistant, etc.

Referring to FIG. 7, communication device 700 can include at least one of the following components: a processing component 702, a memory 704, a power component 706, a multimedia component 708, an audio component 710, an input/output (I/O) interface 712, a sensor component 714, and a communication component 716.

The processing component 702 typically controls the overall operation of the communication device 700, such as operations associated with display, telephone call, data communication, camera operation, and recording operations. The processing component 702 may include one or more processors to execute instructions to complete all or part of the methods described above. In addition, the processing component 702 may include one or more modules to facilitate interactions between the processing component 702 and other components. For example, the processing component 702 may include a multimedia module to facilitate interaction between the multimedia component 708 and the processing component 702.

The memory 704 is configured to store various types of data to support operations in the communication device 700.

Examples of such data include instructions, contact data, phone book data, messages, pictures, videos, and the like for any application or method operating on the communication device 700. The memory 704 can be implemented by any type of volatile or non-volatile storage device or their combination such as static random access memory (SRAM), electrically erasable programmable read-only memory (EE-PROM) erasable programmable read-only memory (EPROM), programmable read-only memory (PROM), read-only memory (ROM), magnetic memory, flash memory, disk or optical disk.

The power component 706 provides power for various components of the communication device 700. The power component 706 may include a power management system, one or more power supplies, and other components associated with generating, managing, and distributing power for the communication device 700.

The multimedia component 708 includes a display screen providing an output interface between the communication device 700 and the user. In some embodiments, the screen may include a liquid crystal display (LCD) and a touch panel (TP). If the screen includes a touch panel, the screen can be implemented as a touch screen to receive input signals from the user. The touch panel includes one or more touch sensors to sense touch, sliding, and gestures on the touch panel. The touch sensor can not only sense the boundaries of touch or sliding actions, but also detect the duration and pressure related to the touch or sliding operation. In some embodiments, the multimedia component 708 includes a front camera and/or a rear camera. When the communication device 700 is in operation mode, such as shooting mode or video mode, the front camera and/or rear camera can receive external multimedia data. Each front camera and rear camera can be a fixed optical lens system or have focal length and optical zoom capability.

The audio component 710 is configured to output and/or input audio signals. For example, the audio component 710 includes a microphone (MIC), which is configured to receive an external audio signal when the communication device 700 is in an operation mode, such as a calling mode, a recording mode, and a voice recognition mode. The received audio signal may be further stored in memory 704 or transmitted via communication component 716. In some embodiments, the audio component 710 also includes a speaker for outputting audio The I/O interface 712 provides an interface between the processing component 702 and peripheral interface modules, which can be a keyboard, click wheel, button, etc. These buttons may include, but are not limited to, the Home button, Volume button, Start button, and Lock button.

The sensor component 714 includes one or more sensors for providing various aspects of condition evaluation for the communication device 700. For example, the sensor component 714 can detect an open/closed state of the communication device 700, relative positioning of the components. The component is, for example, a display and a keypad of the communication device 700. The sensor component 714 can also detect changes in the position of the communication device 700 or one component of the communication device 700, presence or absence of the user's contact with the communication device 700, orientation or acceleration/deceleration of the communication device 700 and temperature change of the communication device 700. The sensor component 714 may include a proximity sensor configured to detect the presence of nearby objects without any physical contact. The sensor component 714 may also include a light sensor, such as a CMOS or CCD image sensor, for use in imaging applications. In some embodiments, the sensor component 714 may also include an acceleration sensor, a gyroscope sensor, a magnetic sensor, a pressure sensor, or a temperature sensor.

The communication component 716 is configured to facilitate wired or wireless communication between the communication device 700 and other devices. The communication device 700 can access wireless networks based on communication standards, such as WiFi, 2G or 3G, or a combination thereof. In some embodiments, the communication component 716 receives a broadcast signal or broadcast related information from an external broadcast management system via a broadcast channel. In some embodiments, the communication component 716 also includes a near field communication (NFC) module to facilitate short range communication. For example, the NFC module can be implemented based on radio frequency identification (RFID) technology, infrared data association (IrDA) technology, ultra wideband (UWB) technology, Bluetooth (BT) technology and other technologies.

In some embodiments, the communication device 700 can be implemented through one or more application specific integrated circuits (ASICs), digital signal processors (DSPs), digital signal processing devices (DSPDs), programmable logic devices (PLDs), field programmable gate arrays (FPGAs), controllers, microcontrollers, microprocessors, or other electronic components, for implementing above methods, In some embodiments, a non-transitory computer-readable storage medium including instructions is also provided, such as a memory 704 including instructions, which can be executed by a processor of the communication device 700 to complete above methods. For example, the non-transitory computer-readable storage medium can be ROM, random access memory (RAM), CD-ROM, tapes, floppy disks, optical data storage devices, etc.

Figure 8:
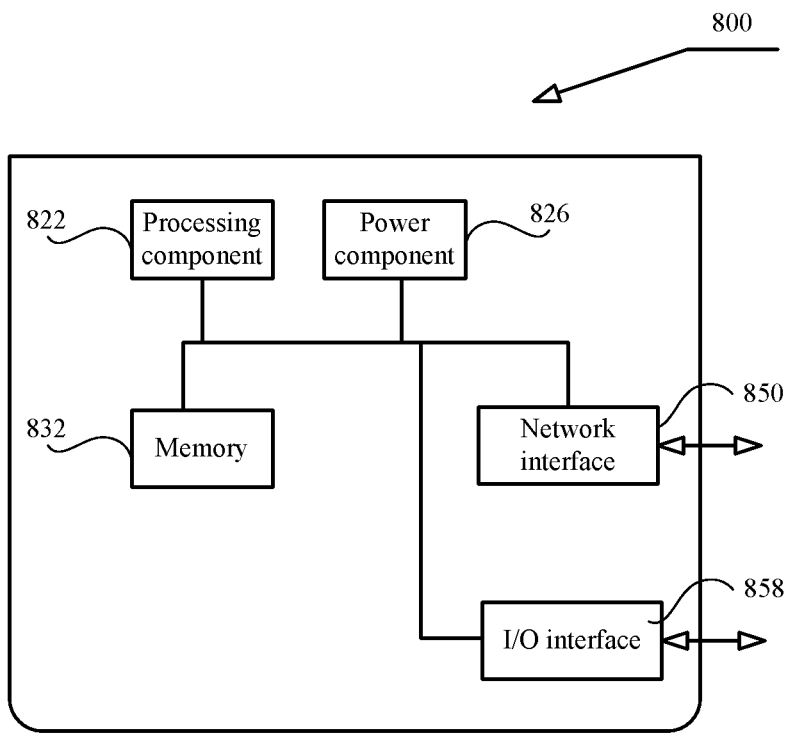
FIG. 8 is a schematic diagram of a communication device according to exemplary embodiments.

As shown in FIG. 8, embodiments of the present disclosure illustrate another communication device. The communication device can be a base station according to embodiments of the present disclosure. For example, communication device 800 can be provided as a network side device. Referring to FIG. 8, the communication device 800 includes a processing component 822, which further includes one or more processors, as well as memory resources represented by a memory 832, for storing instructions that can be executed by the processing component 822, such as application programs. The application programs stored in memory 832 may include one or more modules corresponding to a set of instructions. In addition, the processing component 822 is configured to execute instructions to execute any of the methods applied to the base station described above.

The communication device 800 may also include a power component 826 configured to perform power management of the communication device 800, a wired or wireless network interface 850 configured to connect the communication device 800 to the network, and an input and output (I/O) interface 858. The communication device 800 can operate operating systems stored on the memory 832, such as Windows Server™, Mac OS X™, Linux™, Linux™, FreeBSD™, or similar systems.

After considering the specification and practices of the invention disclosed herein, those skilled in the art will easily come up with other implementation solutions of the present disclosure. The present disclosure aims to cover any variations, uses, or adaptive changes of the present disclosure, which follow the general principles of the present disclosure and include common knowledge or commonly used technical means in the art that are not disclosed in the present disclosure. The specification and embodiments are only considered exemplary, and the true scope and spirit of the present disclosure are defined by appended claims.

It should be understood that the present disclosure is not limited to the precise structure described above and shown in the drawings, and various modifications and changes can be made without departing from its scope. The scope of the present disclosure is limited only by the appended claims.

What is claimed is:

1. A communication method, performed by a terminal, comprising:

determining, according to configuration information sent by a base station, an entrance of the terminal into a power-saving state, wherein the configuration information is determined based on a coverage state of a service satellite of the terminal, and the configuration information comprises starting time information configured for determining the entrance of the terminal into the power-saving state, wherein determining, according to the configuration information sent by the base station, the entrance of the terminal into the power-saving state, comprises:

determining, according to the configuration information, that the terminal is outside a coverage range of the service satellite;

wherein the entrance of the terminal into the power-saving state comprises that the terminal retains configuration information related to an access to a system and is free from performing a task required for an idle state.

2. The method according to claim 1, further comprising:

receiving a signalling carrying the configuration information sent by the base station, wherein the signalling comprises at least one of Radio Resource Control (RRC) signalling, Medium Access Control (MAC) signalling, or physical layer signalling.

3. The method according to claim 1, wherein the configuration information further comprises:

indication information configured for indicating the entrance of the terminal into the power-saving state.

4. The method according to claim 1, wherein the starting time information comprises starting time information for the entrance of the terminal into the power-saving state determined according to ephemeris information of the service satellite.

5. The method according to claim 3, wherein the power-saving state comprises an active state and a sleep state of Discontinuous Reception (DRX) configuration, and the indication information comprises at least one of:

a starting time and a duration indicating an entrance of the terminal into the active state or the sleep state;

the starting time and an ending time indicating the entrance of the terminal into the active state or the sleep state;

detection information indicating that the terminal performs downlink information detection after entering the active state or the sleep state; or satellite information indicating the service satellite of the terminal within at least one service period.

6. The method according to claim 5, wherein the detection information comprises at least one of:

a detection approach;
a number of detections; or
identification information.

7. The method according to claim 5, further comprising:

performing, in response to the entrance of the terminal into the sleep state based on the indication information, detection according to the detection information.

8. A communication method, performed by a base station, comprising:

sending configuration information configured for determining an entrance of a terminal into a power-saving state, wherein the configuration information is determined based on a coverage state of a service satellite of the terminal, and the configuration information comprises starting time information configured for determining the entrance of the terminal into the power-saving state, wherein the configuration information is further configured for determining that the terminal is outside a coverage range of the service satellite, and wherein the entrance of the terminal into the power-saving state comprises that the terminal retains configuration information related to an access to a system and is free from performing a task required for an idle state.

9. The method according to claim 8, wherein sending the configuration information configured for determining the entrance of the terminal into the power-saving state comprises:

sending a signalling carrying the configuration information, wherein the signalling comprises at least one of Radio Resource Control (RRC) signalling, Medium Access Control (MAC) signalling, or physical layer signalling.

10. The method according to claim 8, wherein the configuration information further comprises:

indication information configured for indicating the entrance of the terminal into the power-saving state.

11. The method according to claim 8, wherein the starting time information comprises starting time information for the entrance of the terminal into the power-saving state determined according to ephemeris information of the service satellite.

12. The method according to claim 10, wherein the power-saving state comprises an active state and a sleep state of Discontinuous Reception (DRX) configuration, and the indication information comprises at least one of:

a starting time and a duration indicating an entrance of the terminal into the active state or the sleep state;

the starting time and an ending time indicating the entrance of the terminal into the active state or the sleep state;

detection information indicating that the terminal performs downlink information detection after entering the active state or the sleep state; or satellite information indicating the service satellite of the terminal within at least one service period.

13. The method according to claim 12, wherein the detection information comprises at least one of:

a detection approach;
a number of detections; or
identification information.

14. A terminal, comprising:

at least a processor; and a memory for storing instructions executable by the processor, wherein the processor is configured to:

determine, according to configuration information sent by a base station, an entrance of the terminal into a power-saving state, wherein the configuration information is determined based on a coverage state of a service satellite of the terminal, and the configuration information comprises starting time information configured for determining the entrance of the terminal into the power-saving state, and the processor is further configured to:

determine, according to the configuration information, that the terminal is outside a coverage range of the service satellite;

wherein the entrance of the terminal into the power-saving state comprises that the terminal retains configuration information related to an access to a system and is free from performing a task required for an idle state.

15. The method according to claim 1, further comprising:

entering, in response to determination that the terminal is in the power-saving state and is outside the coverage range of the service satellite, a sleep state.

16. The method according to claim 5, further comprising:

switching, in response to determination that the terminal is in the power-saving state and is within the coverage range of the service satellite, between states according to a cycle and a duration in the DRX configuration.

17. The method according to claim 6, further comprising:

performing, based on at least one of the detection approach, the number of detections, or the identification information, periodic detection on Global Navigation Satellite System (GNSS) information and positioning information.

18. The method according to claim 1, further comprising at least one of:

switching, in response to determination that the terminal is in the power-saving state and is within the coverage range of the service satellite, between an active state and a sleep state according to a predetermined first cycle; or switching, in response to determination that the terminal is in the power-saving state and is outside the coverage range of the service satellite, between the active state and the sleep state according to a predetermined second cycle.

19. The method according to claim 18, wherein a duration of the active state within each cycle outside the coverage range is shorter than a duration of the active state within each cycle within the coverage range.

20. A base station, comprising:

at least a processor; and a memory for storing instructions executable by the processor, wherein the processor is configured to perform the communication method according to claim 8.

* * * * *